United States Patent [19]
Tackett

[11] Patent Number: 5,657,916
[45] Date of Patent: Aug. 19, 1997

[54] STORAGE UNIT HAVING BALLAST CAPABILITY FOR USE IN PICK-UP TRUCKS

[76] Inventor: John Tackett, P. O. Box 872703, Wasilla, Ak. 99687-2703

[21] Appl. No.: 593,239

[22] Filed: Oct. 19, 1995

[51] Int. Cl.$^6$ .................. B60R 9/00; B60R 11/00
[52] U.S. Cl. .......... 224/404; 224/539; 224/540; 224/542; 224/543; 296/37.6; 280/757
[58] Field of Search .................. 224/404, 539, 224/540, 542, 543, 42.11, 42.32; 296/37.6, 39.2; D12/423; 280/757, 758, 759

[56] References Cited

U.S. PATENT DOCUMENTS

| | | | |
|---|---|---|---|
| 4,789,574 | 12/1988 | Selvey | 296/39.2 |
| 5,154,478 | 10/1992 | Erickson et al. | 296/39.2 |
| 5,263,761 | 11/1993 | Hathaway et al. | 296/37.6 |
| 5,419,476 | 5/1995 | White | 224/404 |
| 5,549,428 | 8/1996 | Yeatts | 410/90 |
| 5,568,890 | 10/1996 | Magee et al. | 296/37.6 |

*Primary Examiner*—Henry J. Recla
*Assistant Examiner*—Timothy L. Maust
*Attorney, Agent, or Firm*—Michael J. Tavella

[57] ABSTRACT

A molded shell with a hinged cover for carrying ballast or other items in pick-up truck beds. The shell is designed to fit into the bed of a truck and is formed to fit around the wheel wells. The shell is designed to be half the height of the side walls. This permits large flat objects to be placed on top of the container for convenient hauling. The entire lid is hinged in the front end (i.e., the end nearest the cab). This allows the entire hinge to be lifted and opened, giving access to the entire shell. A second hinge is provided that allows the rear one-third of the lid to open. This gives access to the back of the storage unit from the tailgate. This door can be used to remove sand to place under the wheels if more traction is needed, for example. It also can be used for quick access to frequently used items.

8 Claims, 9 Drawing Sheets

STORAGE UNIT HAVING BALLAST CAPABILITY FOR USE IN PICK-UP TRUCKS

This invention relates to storage units for pick-up trucks and particularly to storage units for pick-up trucks having ballast capability.

BACKGROUND OF THE INVENTION

Pick-up trucks have been used for many years as work vehicles. These trucks typically have a rectangular open bed. The bed has side walls that permit large objects to be carried. Although this type of bed is versatile, it has limitations. Because the bed is open, it affords no protection from the elements. Items stored there are subject to water damage from rain, for example. Also, the beds of most trucks do not have any fixed storage capacity. Thus, anything stored in the bed must be secured or it may shift during transit. Finally, the open bed provides no security to items stored there. Tools, tool boxes and other items are kept in plain view and can easily be taken from the truck.

Many ideas have addressed storage problems of pick-up truck beds. A solution for keeping the elements out of the bed uses a canvas or vinyl cover that snaps around the side walks. This cover does keep the elements out of the bed, however, it reduces the practical space that can be employed. Moreover, the cover is time consuming to remove and to put on.

Many styles of tool boxes, for example are available. These boxes typically are secured behind the truck cab and have lockable doors for access. An example of such a tool box is found in U.S. Pat. No. 4,946,215 to Taylor. In this design, a "T" shaped box is employed. The "T" shape allows the box to fit between the wheel wells in the truck bed. The Taylor device had a hinged, lockable cover and is designed to be fastened down to the truck bed. The device is the same height as the side walls of the truck. Although this device is well designed, it has two flaws. First, it fits in one-half of the truck bed, which effectively reduces the amount of storage space available. Second, the box is the height of the side walls. Although this provides a lot of storage space within the box, it limits the storage space significantly. With this box in place, for example, it is difficult to carry uncut sheets of plywood in the bed.

A second group of storage units can be found in U.S. Pat. No. 2,784,027 to Temp, U.S. Pat. No. 4,575,731 to Knaack et al., and U.S. Pat. No. 4,733,898 to Williams. All of these devices disclose some type of pull out drawer units. The temp design shows a pull out drawer that has a number of different sized storage boxes, and even a water tank and sink. The drawer unit has a fold down support to hold the unit up when it is pulled out. The Knaack et al. design also uses a pull out drawer. This drawer, however, has a number of slots so that the drawer can be partitioned, rather than having fixed partitions. This unit is also lockable. Finally, Williams design has a pair of drawers that pull out of the center of his unit. Besides the drawers, the top of the unit fits over the entire truck bed, including the wheel wells. The Williams design also has four top opening storage boxes formed around the wheel wells. All of these box designed are made to be lower than the truck side walls, thereby leaving ample room for flat storage on top. As good as these devices are, they are not designed to ballast the truck for winter driving conditions. Moreover, unless a person needs long pullout drawers, the storage options are limited to lots of small parts and tools. Anything larger than the drawers, or of an odd shape, can not readily be kept in the drawers.

Besides the storage problem, discussed above, pick-up trucks also have a problem with handling during winter. Most pick-up trucks are rear-wheel drive. Unless these trucks are loaded, they have a tendency to "fishtail" on icy roads. To correct this problem, many truck owners simply add sand bags to the bed of the truck to increase traction. Sand bags are heavy and messy and may shift unless secured. As a result, although sand bags do help, they can be troublesome and even dangerous.

A number of devices have been invented to address the ballast problem directly. These designs are found in U.S. Pat. No. 4,796,914 to Raynor, U.S. Pat. No. 4,971,356, to Cook, U.S. Pat. No. 5,172,953 to Chamberlain, and U.S. Pat. No. 5,330,227 to Anderson. The Raynor design is a bed liner, that conforms to the shape of the truck bed. In this design, liquid ballast can be added as needed to provide additional weight if desired. The bed liner has no protected or secure storage areas. The problem with this design is two fold. First, although bed liners are useful to keep the bed from being damaged, they do nothing to solve the storage problems discussed above. Second, using liquid as ballast in a northern climate is not practical. The liquid will freeze and damage the bed liner. Moreover, the density of most liquids is low compared to other materials, such as sand, requiring much more liquid than sand to achieve the same ballasting effect. The Cook patent teaches use of weights shaped like puzzle pieces as ballast. The idea is to interlock several puzzle pieces to form a block of ballast that covers the truck bed. By using different combinations of blocks, different sized beds may be covered. The problems here are the complexity of assembly and that the blocks are no better than sandbags-just dead weight in the back of the truck. The Chamberlain patent teaches a low level, formed bed liner that has an inner cavity that can be filled with ballast. This design also uses wooden platforms to carry objects and to protect the ballast. The problem here is that there is no protection or security for the stored items. The bed liner protects the bed, but does nothing for the objects carried in the truck. Finally, the Anderson design teaches the use o#long rectangular storage tubes that can hold ballast material. The tubes run the length of the bed and have access doors so that the ballast material can be added. The problem with this design is that filling the tubes is difficult. The tubes are six to eight feet long and have a small door for filling. The tubes must be angled to ensure that the ballast material fills the entire tube (or some type of ram must be used to push the fill to the back of the tube). Again, this design produces nothing more than dead weight in the back of the truck, with no storage or security provisions.

SUMMARY OF THE INVENTION

The present invention overcomes all of these difficulties. It combines ballasting capability with secured storage. The invention is a molded shell with a hinged cover. The shell is designed to fit into the bed of a truck and is designed to fit around the wheel wells. The shell is designed to be half the height of the side walls. The hinged cover can be either curved to match the shell, or can be rectangular to cover the wheel wells. In either case, the large cover permits flat objects to be placed on top of the container for convenient hauling. The cover is hinged and lockable for access to the interior of the shell. The cover has a dual hinge design. The entire lid is hinged in the front end (i.e., the end nearest the cab). This allows the entire lid to be lifted and opened, giving access to the entire shell. This makes loading the shell with ballast, such as sand, easy and fast. It also permits quick cleaning of the shell. Finally, it permits the shell to be used as a secure storage device in the summer, to haul, tools, camping gear, food and supplies, or fishing gear. A second hinge is provided that allows the rear one-third of the lid to open. This gives access to the back of the storage unit from the tailgate. This door also can be used to remove sand from the shell to place under the wheels if more traction is needed, for example. It also can be used for quick access to frequently used items.

It is an object of this invention to produce a storage container for pick-up trucks that can readily be used to store ballast for winter driving.

It is another object of this invention to produce a storage container for pick-up trucks that has multiple hinges allowing for convenient access to the container.

It is yet another object of this invention to produce a storage container for pick-up trucks that has a large flat top surface that allows bulk items to be stored in the pick-up bed without difficulty.

It is a further object of this invention to produce a storage container for pick-up trucks that can be loaded or unloaded with ballast or other items quickly and easily.

DETAILED DESCRIPTION OF THE INVENTION

Figure 1:
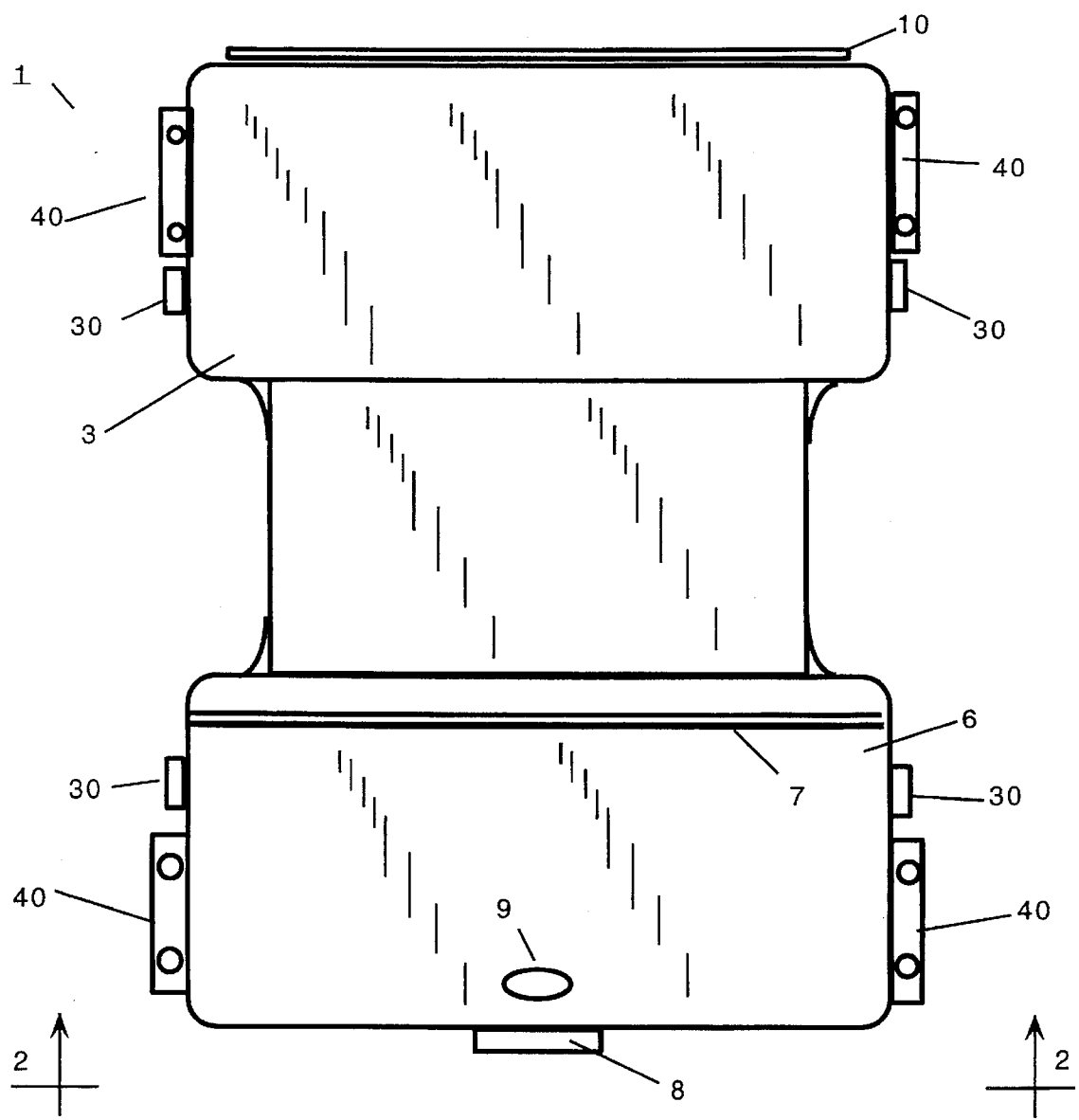
FIG. 1 is a top view of the first embodiment of the vehicle storage box.
Figure 2:
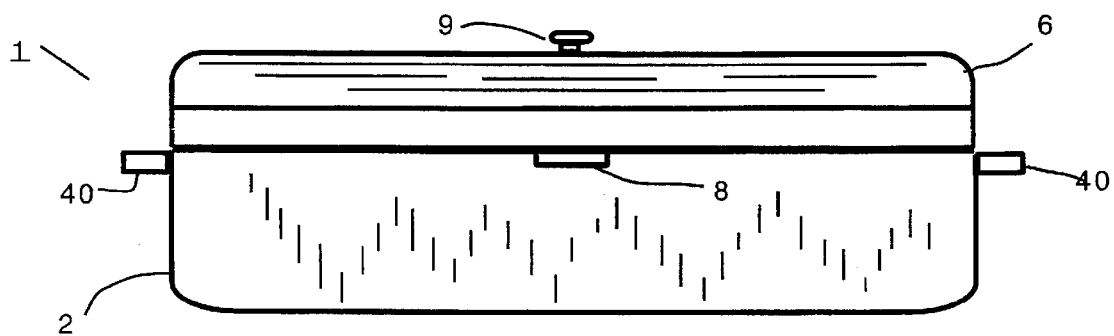
FIG. 2 is a front view of the first embodiment, taken along the lines 2—2
Figure 3:
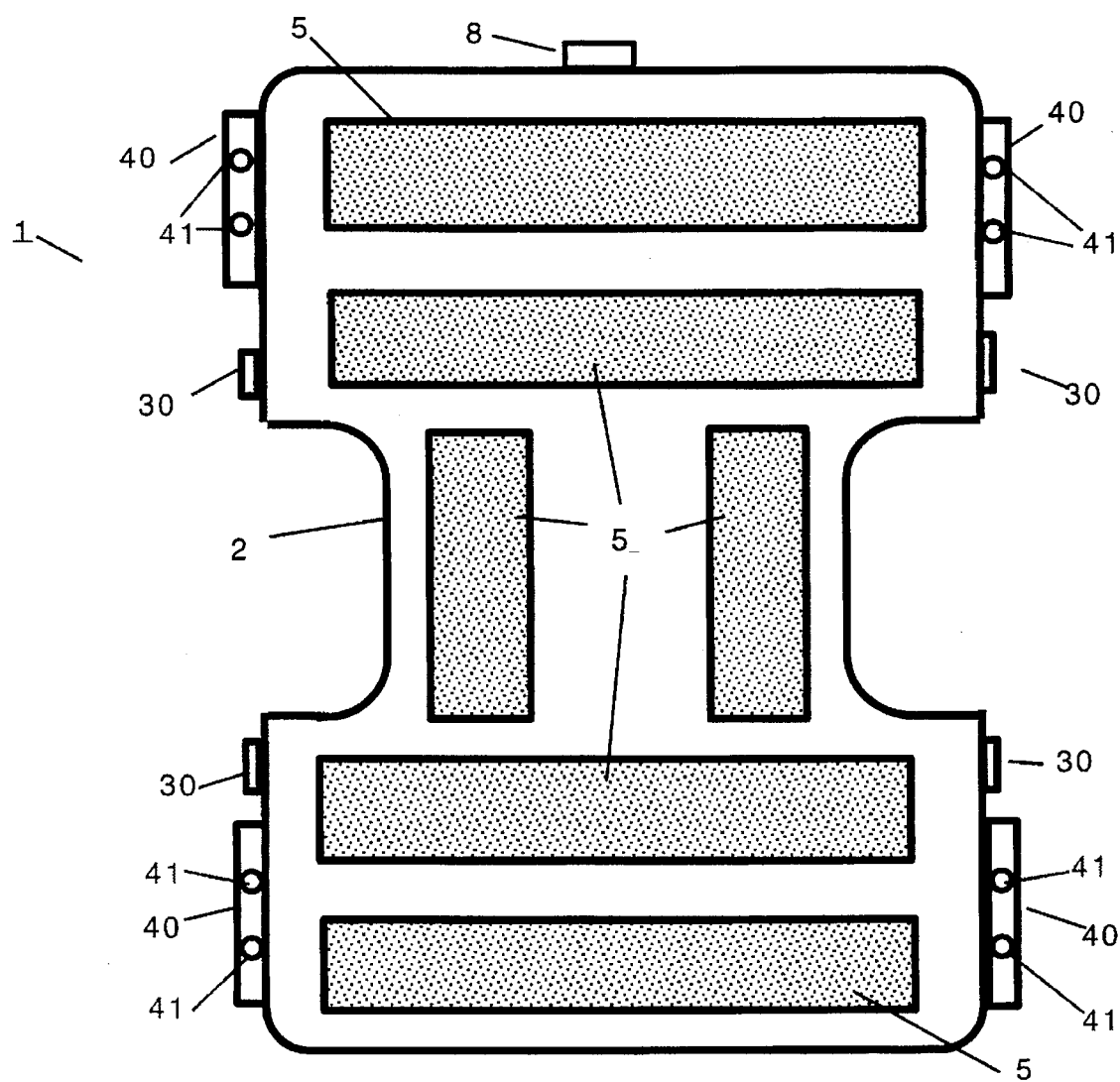
FIG. 3 is a bottom view of the first embodiment.
Figure 4:
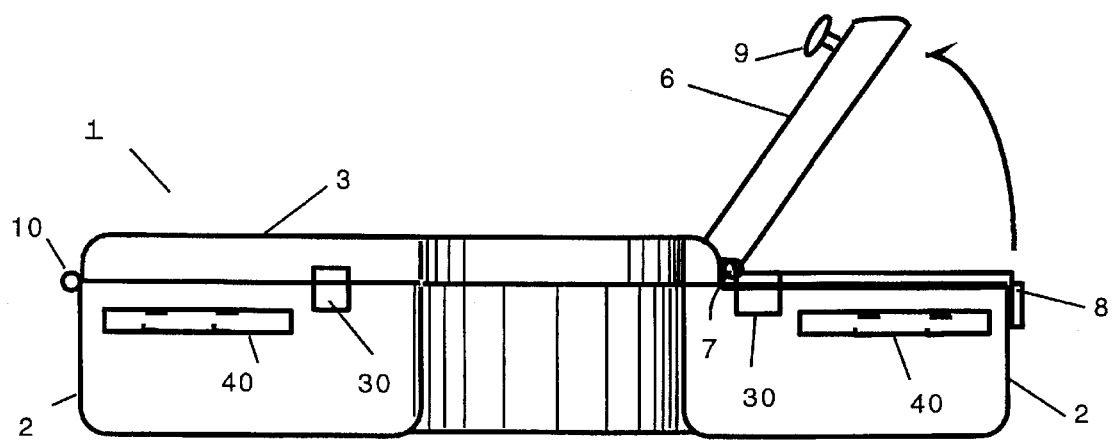
FIG. 4 is a side view of the first embodiment with the small hatch open.
Figure 5:
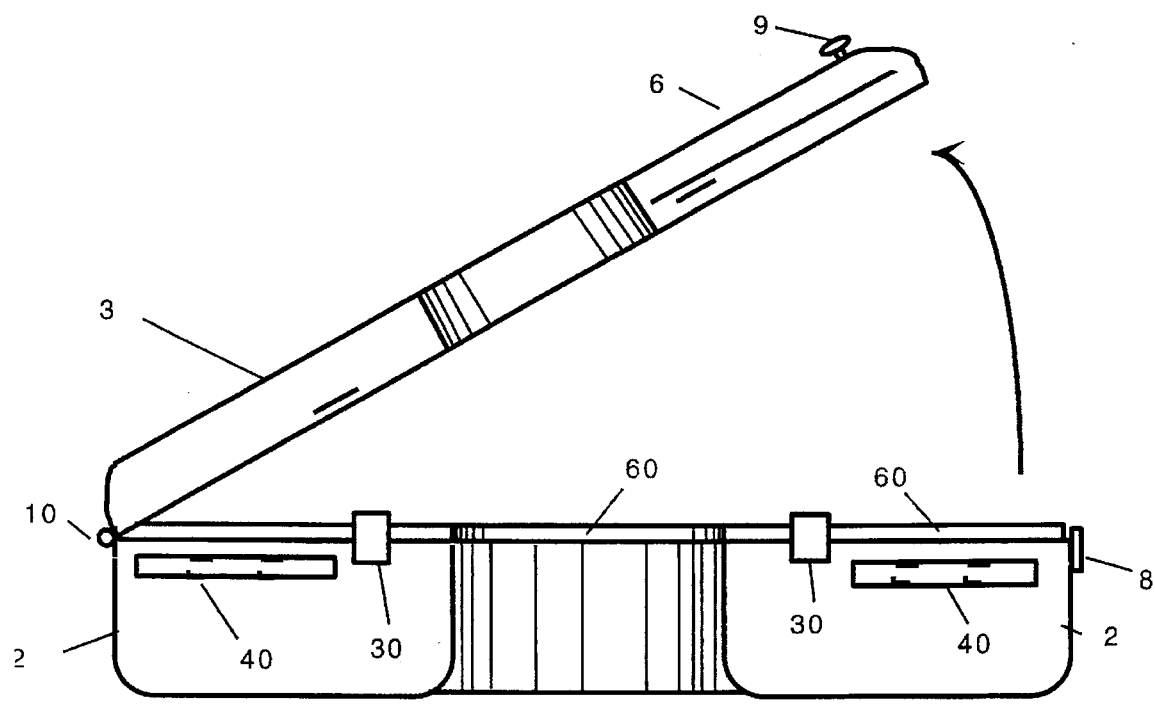
FIG. 5 is a side view of the first embodiment with the full length hatch open.

Referring now to FIGS. 1 through 5, The first embodiment of a storage box 1 is shown. This embodiment has a storage compartment 2 and a full size hinged lid 3. In this embodiment, the storage compartment 2 and the hinged lid 3 are formed to fit around the wheel wells in a typical truck bed. FIG. 3 shows the bottom 4 of the storage compartment 2. A series of non-skid pads 5 are attached to the bottom 4 of the storage compartment 2 as shown in FIG. 3. FIGS. 2, 4 and 5 show the hatch features of the lid 3. FIG. 4 shows the small back hatch 6. The small hatch 6 permits easy access to the rear of the storage compartment 2 without having to open the entire lid 3. By using the small hatch 6, small items can be quickly retrieved from the storage compartment 2 as desired. A hinge 7 is attached to the small hatch 6 and the lid 3 to operate the hatch. A front latch 8 is also provided (see FIG. 2) to secure and, if desired, to lock the hatch 6 down. A handle 9 is provided to open or close the hatch 6.

FIG. 5 shows the operation of the entire lid 3 as shown. Here, a hinge 10 is used to open the entire lid 3 as shown. In this way, access to the entire storage compartment 2 is quick and easy.

Figure 6:
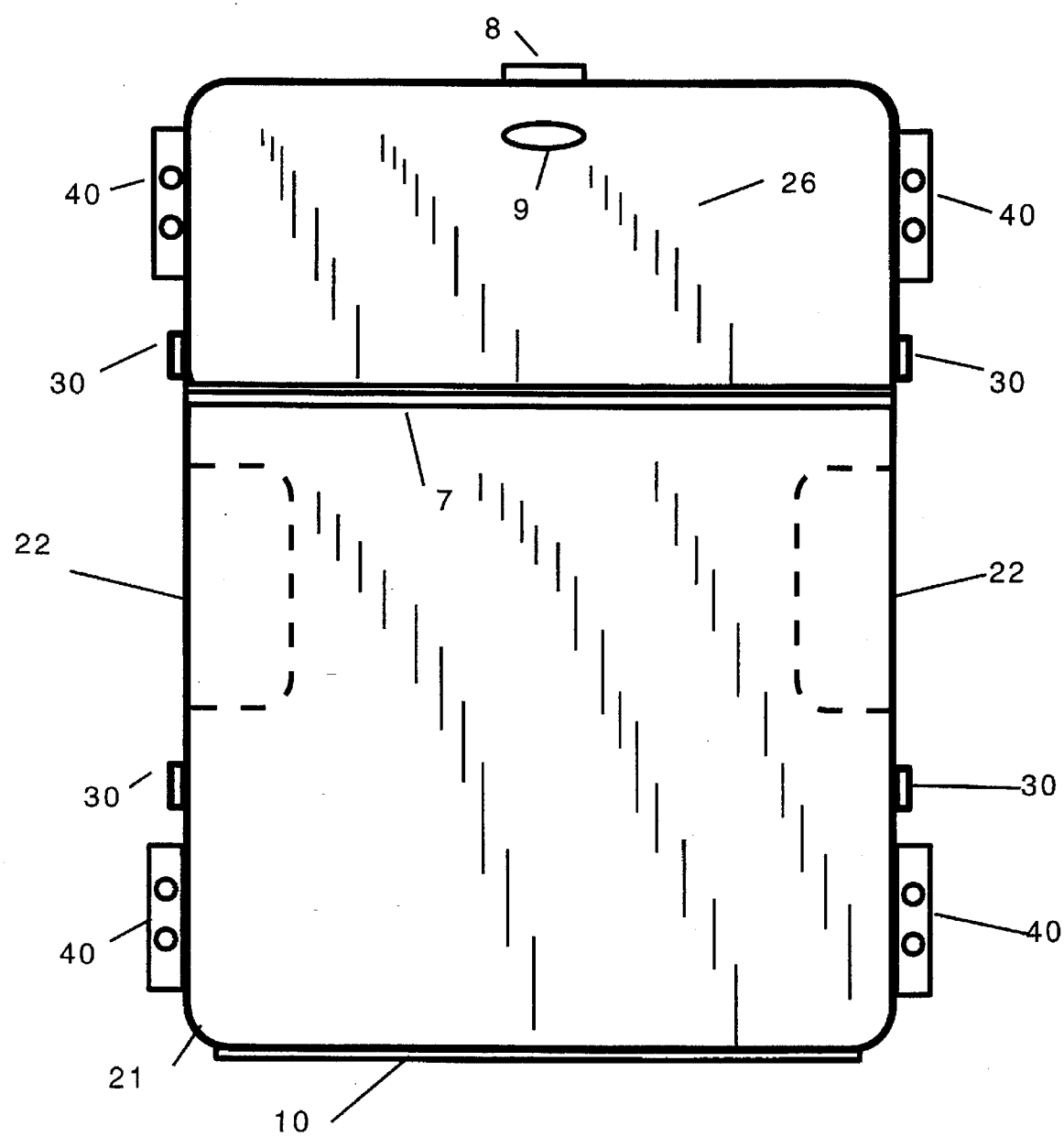
FIG. 6 is a top view of the second embodiment of the vehicle storage box.
Figure 7:
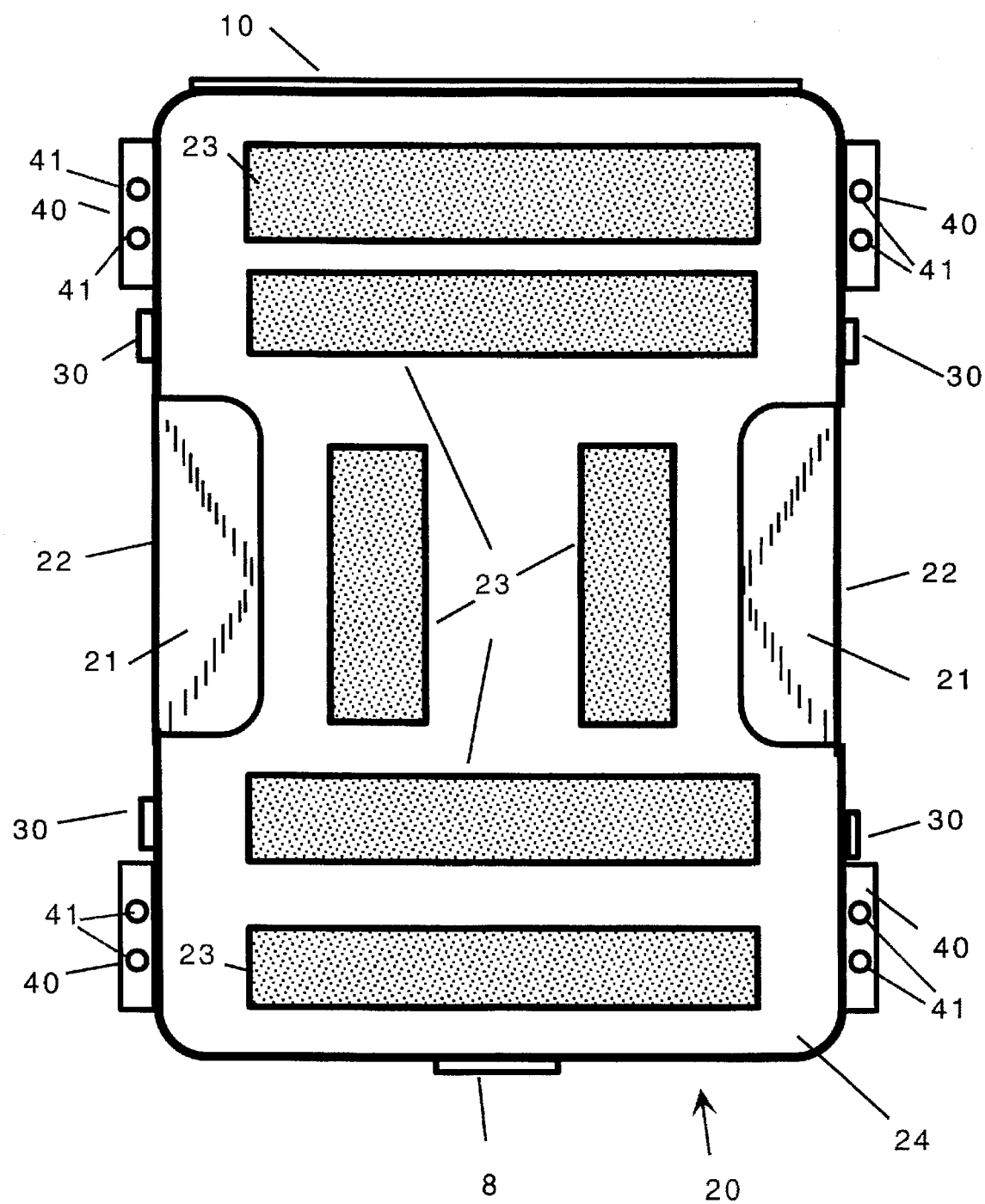
FIG. 7 is a bottom view of the second embodiment.
Figure 8:
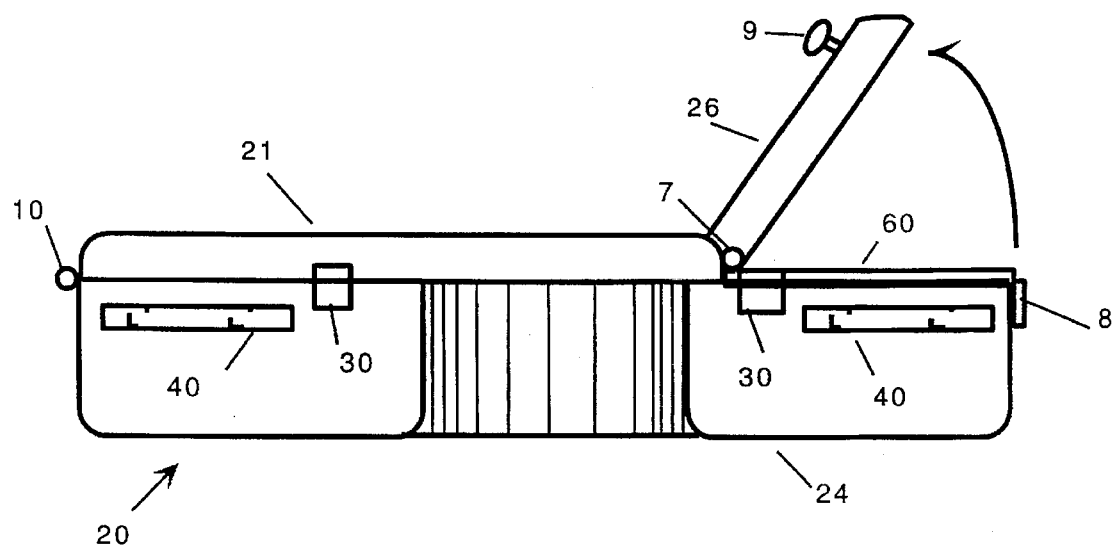
FIG. 8 is a side view of the second embodiment with the small hatch open.
Figure 9:
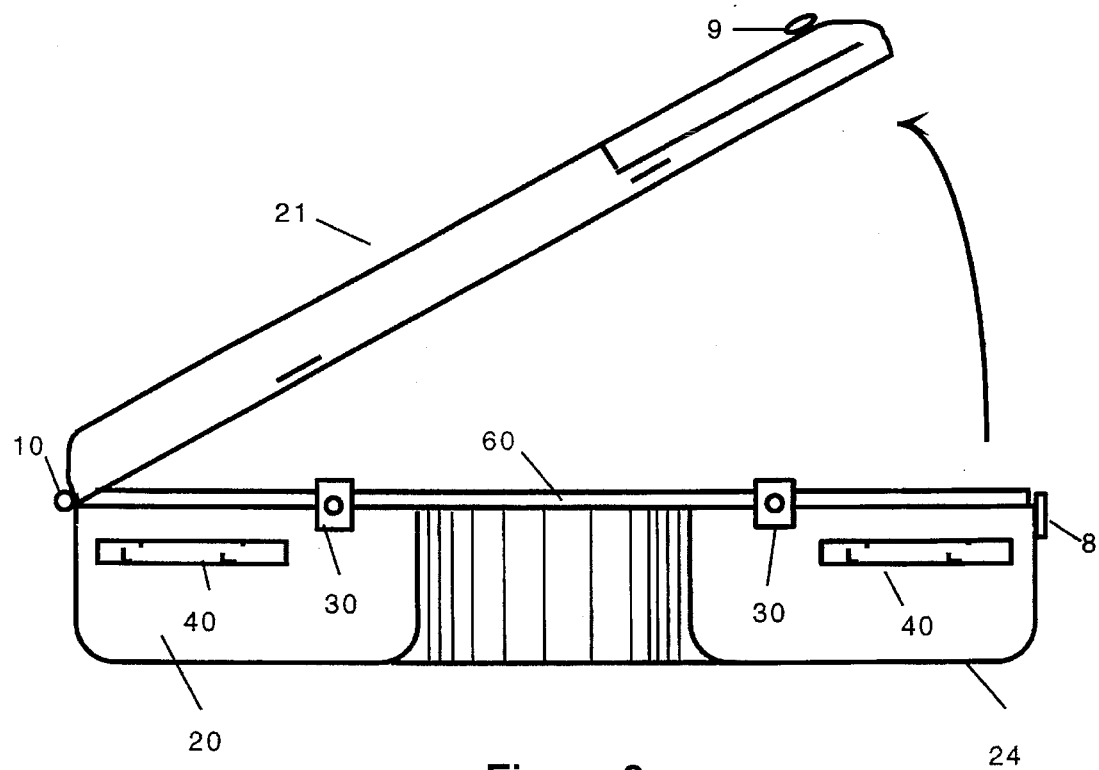
FIG. 9 is a side view of the second embodiment with the full length hatch open.

Referring now to FIGS. 6 through 9, details of the second embodiment are shown. In this embodiment, the storage box 20 is contoured to fit around the pick-up truck wheel wells, but the lid 21 is not. In this embodiment, therefore, the storage box 20 should have a height equal to that of the wheel wells. As shown in FIG. 6, the lid 21 has straight edges 22 instead of the cut out edges of FIG. 1. All other features of the second embodiment are identical to that of the first embodiment. FIG. 7 shows the bottom 24 of the storage box 20 in the second embodiment. As in the first embodiment, several strips of non-skid material 23 are attached to the bottom 24 of the storage box 20. FIGS. 8 and 9 show the small hatch 26 and the full lid 21 in their open positions. The operation of the hatch 26 and the lid 21 in this embodiment is identical to that of the first embodiment.

In both embodiments, side latches 30 are provided to better secure the lids 3 or 21. In the preferred embodiment, five latches are used (the four latches 30 and the front latch 8) are used to secure the lids. The figures show the placement of the latches 30 and 8 on the storage box 1 or 20. The latches 30 or 8 are ordinary hardware latches common to the art. These latches can also be the lockable type to provide additional security.

Referring to FIGS. 1 and 6, four securing flanges 40 can also be used to secure the storage box 1 or 20 to the truck bed. The securing flanges 40 have bolt holes 41 so that bolts (not shown) can secure the storage box 1 or 20 to the truck.

Referring to FIGS. 5 and 9, a side wall 60 is used to provide a tight seal between the lid 3 or 21 and the storage box 1 or 20. The side wall 60 extends above the body of the storage box 1 or 20 as shown and fits within the lid (either 3 or 21). As shown if FIG. 5, the side wall 60 of the preferred embodiment is curved to match the contours of the storage box 1 or 20. In the second embodiment, the side wall 60 runs straight along the lid 21 to match the lid 21 when the lid 21 is closed.

Figure 10:
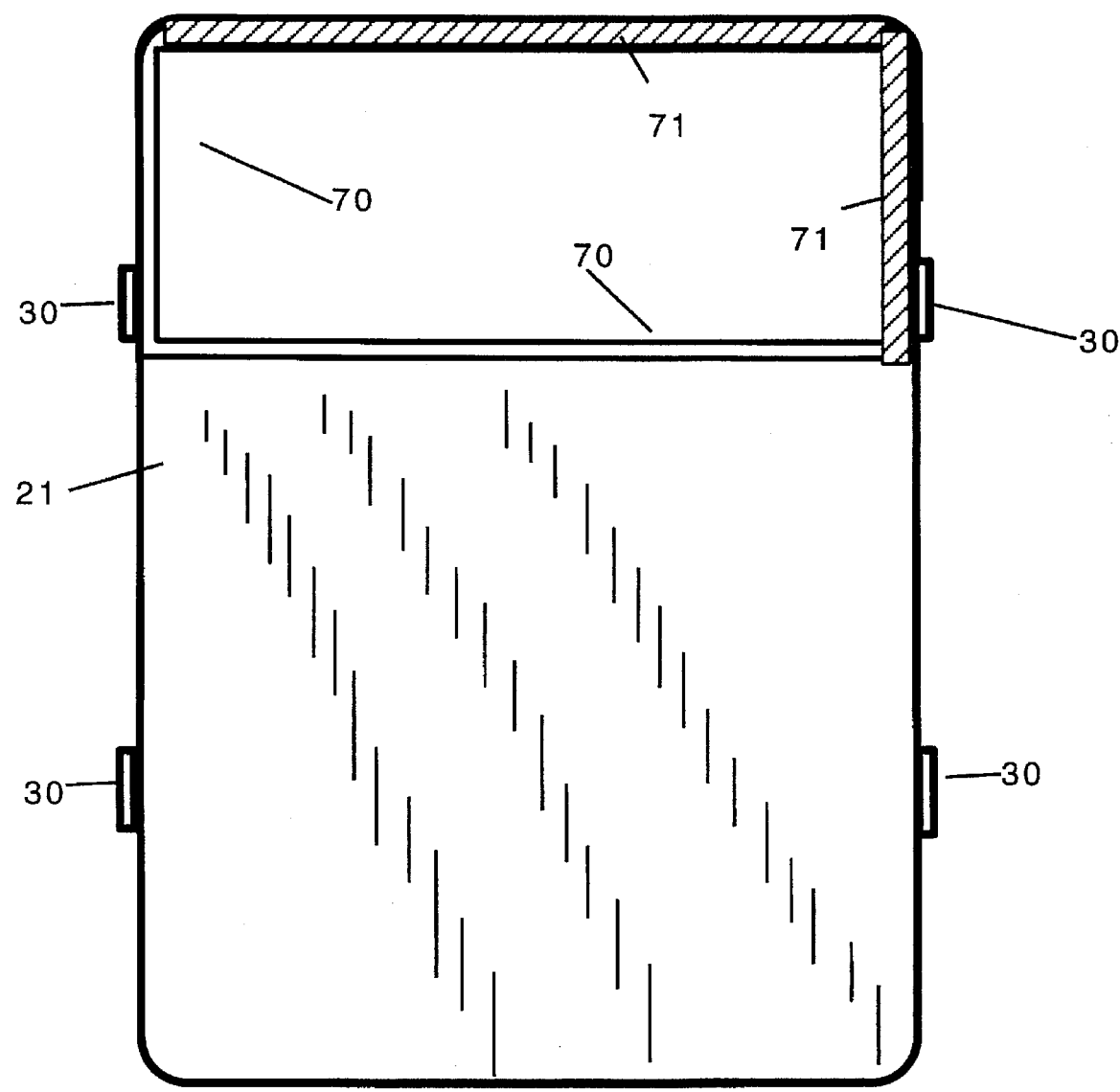
FIG. 10 is a top view of the full length hatch of the second embodiment with the small hatch removed.

Referring now to FIGS. 10 through 13, details of the small hatch 26 construction are shown. FIG. 10 shows the lid 21 (note the lid 3 has identical construction for the hatch 6). A side wall 70 is formed to receive the small hatch 26. Weather stripping 71 is placed over the side wall 70 to form a tight seal between the lid 21 and the small hatch 26. Note that FIG. 10 only shows weather-stripping on two of the surfaces so that the side wall 70 is visible. Weather-stripping 71 is actually placed completely around the perimeter of the side wall 70.

Figure 11:
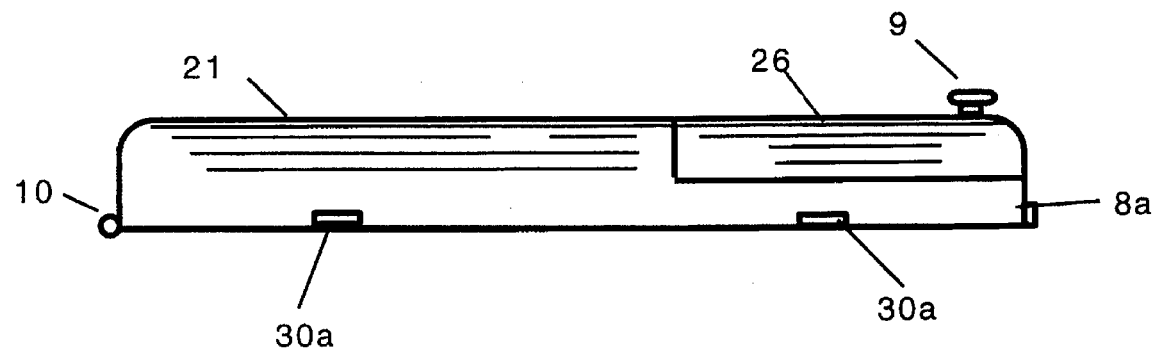
FIG. 11 is a side view of the full length hatch of the second embodiment.
Figure 12:
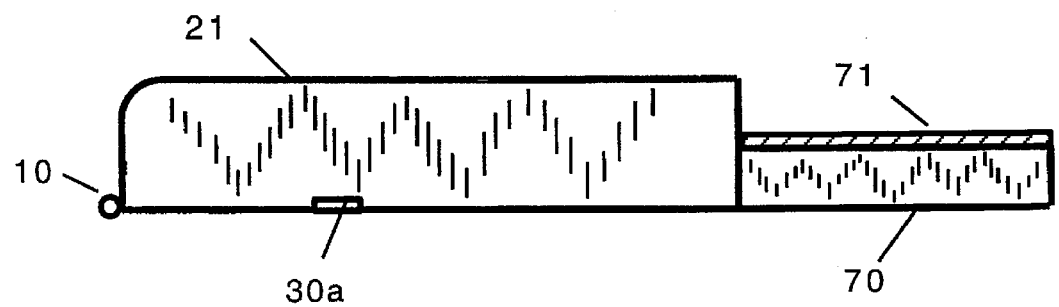
FIG. 12 is a side view of the full length hatch with the small hatch removed.
Figure 13:
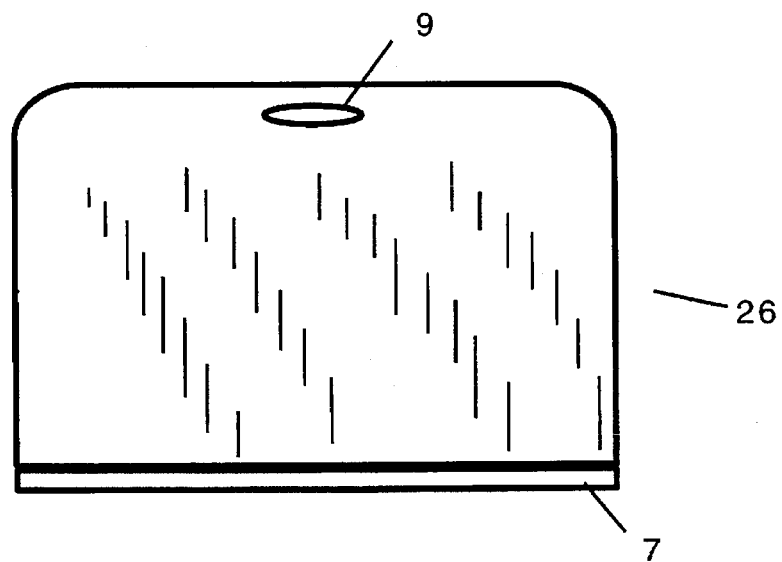
FIG. 13 is a top view of the small hatch.

FIGS. 11, 12, and 13 show details of the lid 21 and the small hatch 26. FIGS. 11 and 12 show the lid 21, but the features shown apply equally to the lid 3. FIG. 13 is a top view of the small hatch either (3 or 21). The handle 9 and the hinge 7 are shown. Note that only the top portions of the latches 31a and 8a are shown in FIGS. 11 and 12.

Figure 14:
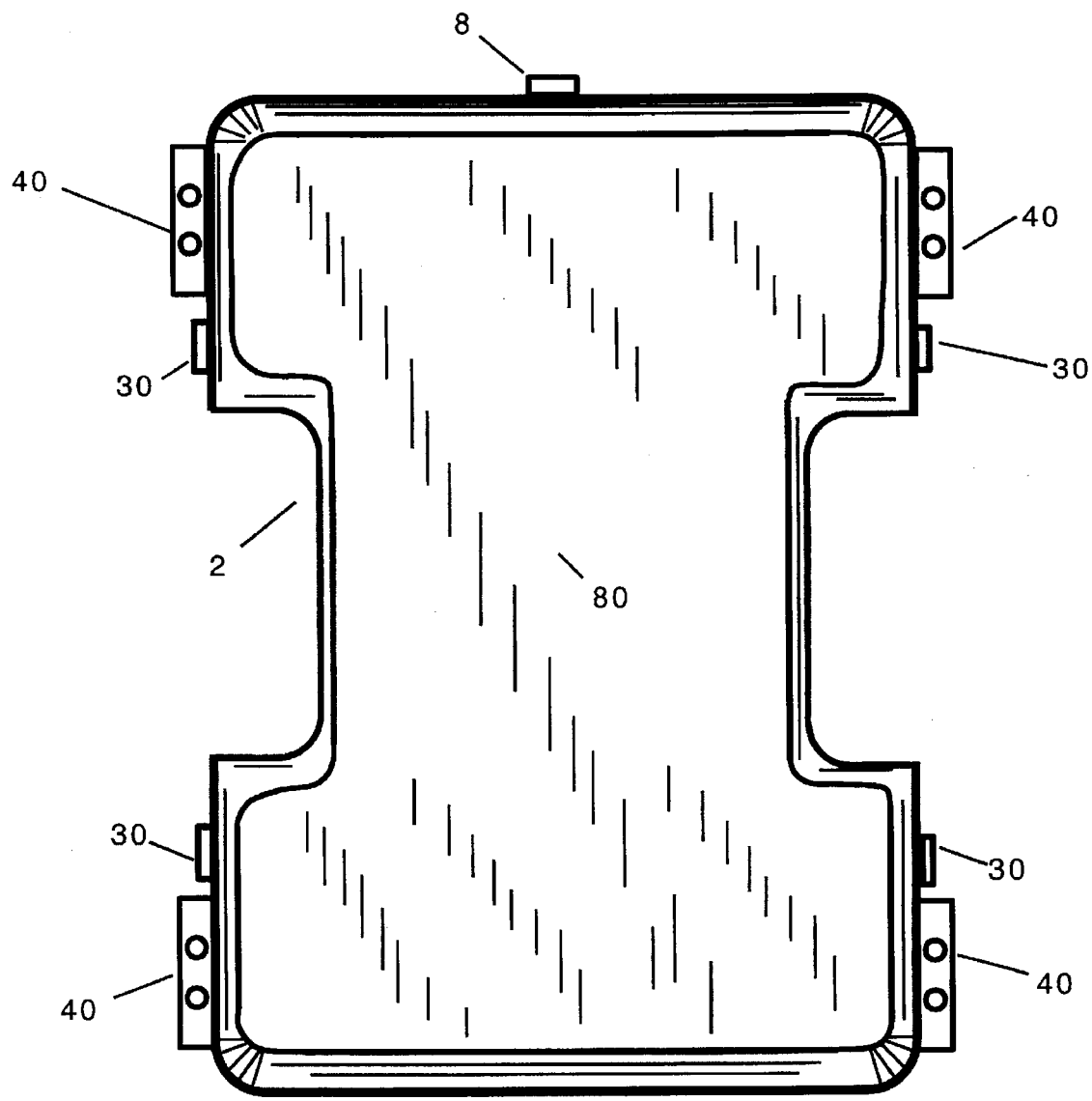
FIG. 14 is an interior view of the storage box with the hatch removed.

FIG. 14 is a top view of the storage box 1 or 20 with the lid 3 or 21 removed. It shows a formed interior bottom surface 80. The bottom of the storage box 1 or 20 is rounded in the edges as shown. The rounded edges make cleaning of the box easier as materials do not stick to the smooth curves as compared to straight right-angle edges.

In the preferred embodiment, the storage box 1 is made of injection molded high strength plastic. Internal ribs can be added for additional strength. The storage box 1 can also be made of fiberglass or other composite materials.

The storage box 1 or 20 is intended to be a sand carrier in the winter in the northern regions. In those regions, ice and snow in the roads reduce traction on pick up tires. Adding weight to the beds of pick-ups is a well-known method of providing additional traction and stability to the truck. Use of the storage box 1 or 20 allows the sand to be spread over the entire truck bed, ensuring a balanced load. Moreover, by keeping the sand in the box, it remains dry and easy to remove. Finally, using the storage box 1 or 20 as taught here allows for easy loading and removal of the sand, unlike the prior art devices mentioned above.

In the summer, or in warm climate regions, the storage box 1 or 20 can be used to carry anything that fits in the box, including tools and camping gear, for example. The advantage of this design is that the open storage box 1 or 20 gives a lot of room to hold large or bulky items, unlike storage boxes that have drawers, for example.

In both summer and winter, the flat lid 3 or 21 permits large sheet goods to be carried in the bed without difficulty. For example, plywood sheets can be placed directly on the lid 3 or 21 and carried without difficulty in the bed. Large boxes and even furniture can also be carried in the bed on the surface of the lid 3 or 21. In cases where several items are placed on the lid 3 or 21, access to the interior of the storage box 1 or 20 through the small hatch 6 or 26 is possible.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A storage unit for use in a pick-up truck bed having a bottom bed wall, opposed side bed walls projecting upward from the bottom bed wall, and having a pair of opposed wheel well covers protruding inwardly into said pick-up truck bed comprising:
   a) a lower storage compartment, having an open top, a bottom and four side walls extending upward from said bottom; said lower storage compartment having a pair of contoured side walls to fit around the pair of opposed wheel well covers of the pick-up truck;
   b) a plurality of non-skid patches, fixedly attached to the bottom of said lower storage compartment and being in contact with the bottom bed wall of said pick-up truck bed;
   c) a hatch cover, being hingably attached to said lower storage compartment, such that said hatch cover covers the open, top of said lower storage compartment, and also having contoured side walls to conform to the contoured side walls of the lower storage compartment; and
   d) means for latching said hatch cover, operatively attached to said hatch cover and said lower storage compartment.

2. The storage unit for use in a pick-up truck bed of claim 1 further comprising at least one securing flange, fixedly attached to said storage unit to secure said storage unit to said pick-up truck bed.

3. The storage unit for use in a pick-up truck bed of claim 1 further comprising a rear access hatch, formed in said hatch cover, and being hingably mounted to said hatch cover such that said rear access hatch covers a portion of the hatch cover and permits access to the lower storage compartment; and a means for latching said rear access hatch, operatively attached to said hatch cover and said rear access hatch.

4. A storage unit for use in a pick-up truck bed having a bottom bed wall, opposed side bed walls projecting upward from the bottom bed wall, and having a pair of opposed wheel well covers protruding inwardly into said pick-up truck bed comprising:
   a) a lower storage compartment, having an open top, a bottom and four side walls extending upward from said bottom; said lower storage compartment having a pair of contoured side walls to fit around the pair of opposed wheel well covers of the pick-up truck bed;
   b) a plurality of non-skid patches, fixedly attached to the bottom of said lower storage compartment and being in contact with the bottom bed wall of said pick-up truck bed;
   c) a hatch cover, being hingably attached to said lower storage compartment, such that said hatch cover covers the open top of said lower storage compartment, said hatch cover being generally rectangular, thereby covering said wheel well covers of said pick-up truck, said hatch cover further including a rear access hatch, formed in said hatch cover, and being hingably mounted to said hatch cover such that said rear access hatch covers a portion of the hatch cover and permits access to the lower storage compartment;
   d) means for latching said hatch cover, operatively attached to said hatch cover and said lower storage compartment.

5. The storage unit for use in a pick-up truck bed of claim 4 further comprising at least one securing flange, fixedly attached to said storage unit to secure said storage unit to said pick-up truck bed.

6. The storage unit for use in a pick-up truck bed of claim 4 further comprising a means for latching said rear access hatch, operatively attached to said hatch cover and said rear access hatch.

7. A storage unit for use in a pick-up truck bed having a bottom bed wall, opposed side bed walls projecting upward from the bottom bed wall, and having a wheel well covers protruding inwardly into said pick-up truck bed comprising:
   a) a lower storage compartment, having an open top, a bottom and four side walls extending upward from said bottom; said lower storage compartment having a pair of contoured side walls to fit around the pair of opposed wheel well covers of the pick-up truck;
   b) a plurality of non-skid patches, fixedly attached to the bottom of said lower storage compartment and being in contact with the bottom bed wall of said pick-up truck bed;
   c) a hatch cover, being hingably attached to said lower storage compartment, such that said hatch cover covers the open top of said lower storage compartment, and also having contoured side walls to conform to the contoured side walls of the lower storage compartment; said hatch cover further including a rear access hatch, formed in said hatch cover, and being hingably mounted to said hatch cover such that said rear access hatch covers a portion of the hatch cover and permits access to the lower storage compartment;

d) means for latching said rear access hatch, operatively attached to said hatch cover and said rear access hatch; and e) means for latching said hatch cover, operatively attached to said hatch cover and said lower storage compartment.

8. The storage unit for use in a pick-up truck bed of claim 7 further comprising at least one securing flange, fixedly attached to said storage unit to secure said storage unit to said pick-up truck bed.

* * * * *